United States Patent [19]

Chapman et al.

[11] 4,102,450

[45] Jul. 25, 1978

[54] CONTAINER WASHING AND/OR FILLING MACHINES

[75] Inventors: Christopher P. Chapman; Owen Clarkson, both of Rochester, England

[73] Assignee: Burnett & Rolfe Limited, Rochester, England

[21] Appl. No.: 724,093

[22] Filed: Sep. 17, 1976

[30] Foreign Application Priority Data

Sep. 23, 1975 [GB] United Kingdom ............... 39003/75

[51] Int. Cl.[2] ............................................ B65G 25/02

[52] U.S. Cl. ...................................... 198/774; 60/546

[58] Field of Search ............... 198/488, 774, 775, 776, 198/629; 187/8.59, 17; 254/89 H; 91/411 R, 411 A, 411 B; 92/8-12; 60/546

[56] References Cited

U.S. PATENT DOCUMENTS

| | | | |
|---|---|---|---|
| 2,497,768 | 2/1950 | Hallead | 198/774 |
| 3,003,615 | 10/1961 | Ruppe | 198/774 |
| 3,176,801 | 4/1965 | Huff | 92/9 X |
| 3,193,988 | 7/1965 | Kudlaty | 92/8 X |
| 3,211,306 | 10/1965 | Nissen et al. | 187/8.59 X |
| 3,221,870 | 12/1965 | Pagay | 198/774 |
| 3,476,016 | 11/1969 | Dixon et al. | 91/411 R |
| 3,850,078 | 11/1974 | Polizzi | 92/8 X |
| 3,872,647 | 3/1975 | Langen et al. | 198/425 X |
| 3,963,115 | 6/1976 | Teske et al. | 198/718 |

*Primary Examiner*—Evon C. Blunk
*Assistant Examiner*—James L. Rowland
*Attorney, Agent, or Firm*—Sughrue, Rothwell, Mion, Zinn and Macpeak

[57] ABSTRACT

A machine for washing and/or filling containers such as beer kegs has a walking beam conveyor for moving the containers through the machine from one station to another. The walking beam is raised and lowered by two spaced-apart upright pneumatic rams and to maintain the walking beam in its correct attitude regardless of variations with loads upon it, a spaced-apart pair of double-acting hydraulic pistons and cylinders are arranged to act between the walking beam and a base frame of the machine, the cylinders being cross-connected so that the pistons are constrained to move in unison by the movement of hydraulic liquid between the cylinders. Preferably, each of the hydraulic pistons and cylinders is incorporated co-axially as a unit with one of the pneumatic rams.

7 Claims, 3 Drawing Figures

CONTAINER WASHING AND/OR FILLING MACHINES

This invention is concerned with machines for washing and/or filling beer kegs and other containers, and in particular it is concerned with the way in which the containers are supported and moved through such a machine.

Previously the containers have been moved through such a machine on a continuously operating chain conveyor and they have been lifted clear of the conveyor at each washing and filling station. This means that each container has to be separately aligned with the washing or filling head at each station. It also means that each washing and filling head must be mounted so that it is vertically movable to lift the containers away from the chain conveyor and this entails flexible connections for each of the various services connected to the heads. It has also been proposed to use a walking beam conveyor for moving containers in sequence through the machine but with such conveyors difficulties are involved in keeping the beam level as it is raised and lowered. The weight distribution on such a beam is very uneven since the containers are usually introduced into the machine at one end of the conveyor virtually empty and leave the other end of the conveyor full. Even this distribution is not constant since occasionally a container is introduced which is partly full and sometimes an empty container which has been rejected as faulty leaves the machine. The filled containers at the downstream end of the beam are very much heavier than the unfilled containers at the upstream end of the beam and, in the case of beer kegs, this difference in weight may be up to about 160 Kg.

According to this invention a machine for washing and/or filling beer kegs or other containers includes a walking beam conveyor for moving the containers stepwise through it, the walking beam assembly being raised and lowered by two spaced-apart upright pneumatic rams, the machine also including a spaced-apart pair of double-acting hydraulic pistons and cylinders which are arranged to act between the walking beam assembly and a base frame of the machine and which are cross-connected so that, in use, their operating members are constrained to move in unison by the movement of hydraulic liquid between them whereby the attitude of the walking beam assembly is strictly maintained.

Such a machine overcomes the disadvantages of the earlier machines and provides the key to the construction of a combined washing and filling machine which is simpler, more robust and has a greater efficiency than those which have been used or proposed previously. The use of a walking beam conveyor for moving the containers stepwise through the machine enables the washing and filling heads to be rigidly fixed to the machine so that most if not all of the services connected to each head may be supplied through rigid pipe connections. The rigidly mounted heads and their rigid connections require very little maintenance and have the additional advantage that they enable the machine to be constructed more cheaply. Since the attitude of the walking beam assembly is strictly maintained by the use of the cross-connected hydraulic pistons and cylinders, once the containers have been positioned within a close tolerance on the walking beam assembly they are moved through the machine stepwise maintaining a close correspondence in their positions so that they are brought into equally close registry with each process station throughout the machine.

Preferably each pneumatic ram is associated with one of the hydraulic pistons and cylinders and each pneumatic ram is arranged to act coaxially with its associated hydraulic piston and cylinder. Preferably the operating member of each pneumatic ram passes through the hydraulic cylinder associated with each ram and has the piston of the associated hydraulic piston and cylinder mounted on it.

Preferably an axle with a pair of wheels is mounted on the operating member of each pneumatic ram and a substantially horizontal carriage is mounted on the wheels of both axles so that it can slide back and forth. The machine preferably includes a further penumatic ram which is arranged to move the carriage back and forth to, in use, move containers through the machine.

An example of a combined beer keg washing and filling machine in accordance with this invention will now be described with reference to the accompanying drawings, in which.

Figure 1:
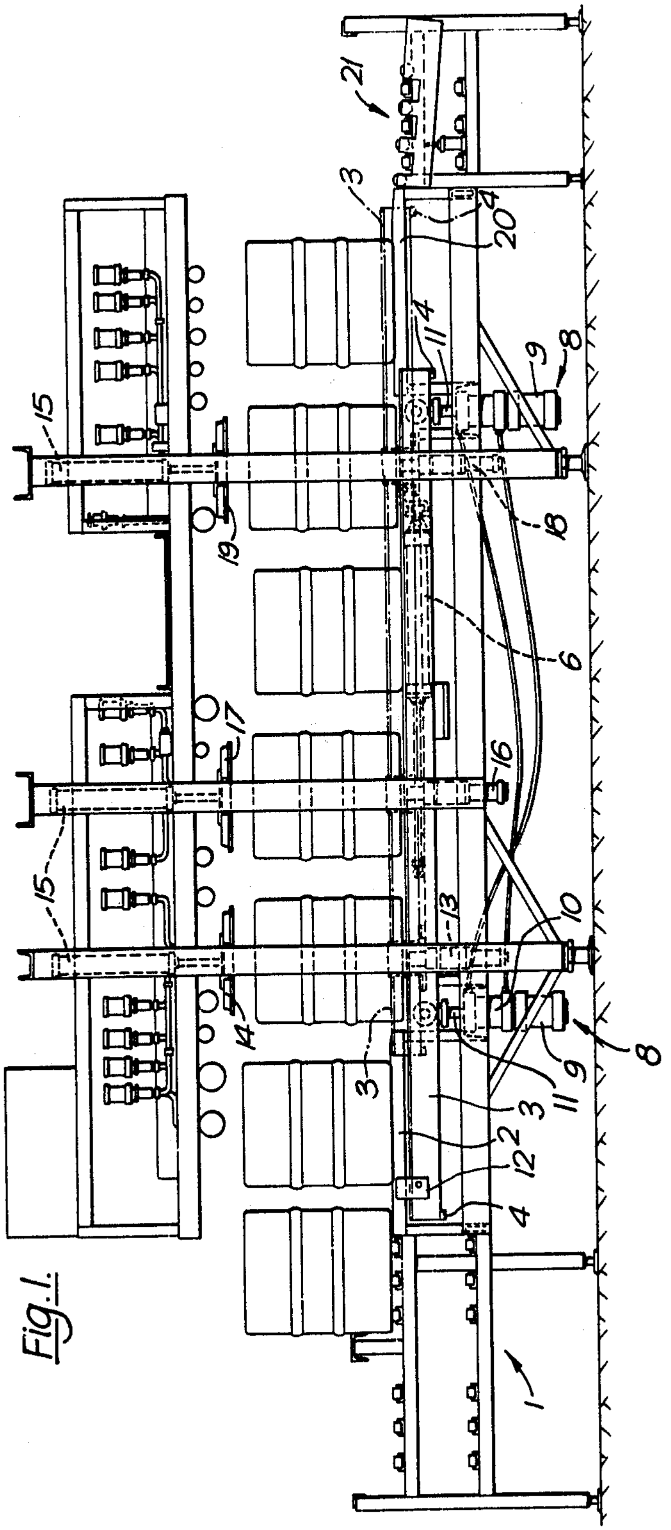
FIG. 1 is a diagrammatic side elevation of the machine.
Figure 2:
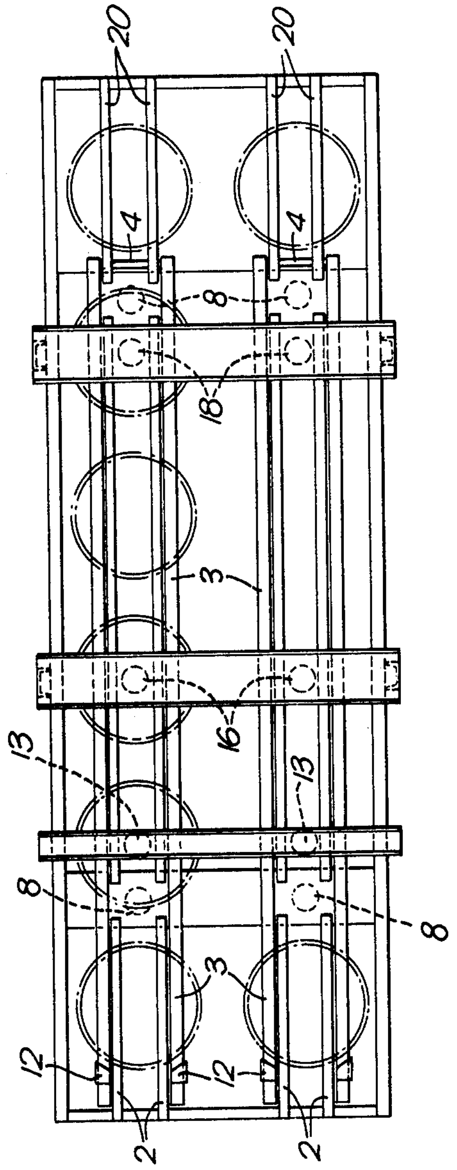
FIG. 2 is a simplified plan.
Figure 3:
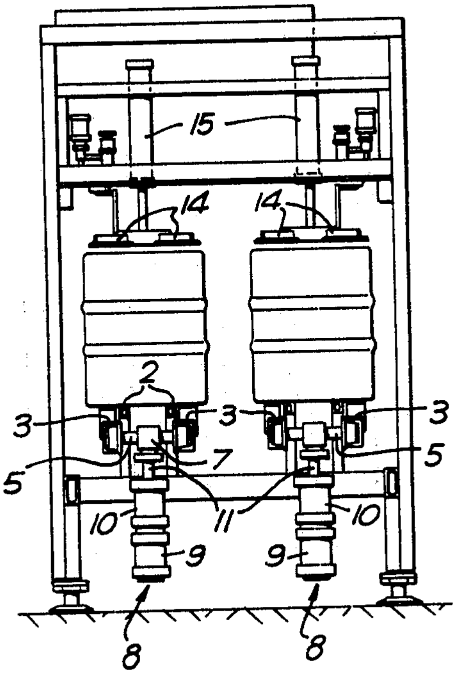
FIG. 3 is a diagrammatic end elevation.

This machine is arranged for use with metal beer kegs of the type having an opening with a self-closing valve and a spear extending from the opening into the keg. Dirty, empty kegs are fed to the machine by a feed conveyor 1 with their openings downwards. The washing and filling machine is arranged to handle two separate lanes of kegs independently of each other at the same time and as both of these lanes are identical, only one of them will be described. Kegs are pulled one at a time from the feed conveyor 1 onto a pair of stationary rails 2 by a keg feeding device which is described fully in our earlier British Patent Specification No. 1319829. The kegs are moved from the rails 2 and on through the machine by a walking beam type conveyor which operates in the following sequence, firstly it moves upwards, then it moves forwards through the machine through the full extent of its travel and then it is lowered; finally, whilst it is in its lowered position, it moves backwards to its initial position.

The conveyor includes a carriage formed by two rails 3 of channel section joined by cross-pieces 4. The carriage is supported on a pair of wheeled axles 5 and is arranged to slide backwards and forwards on them. The carriage is moved backwards and forwards by a single pneumatic ram 6 which is arranged to act between the carriage and a base frame of the machine. Each axle is supported by a journal 7 which is attached to the piston rod of an upright combined pneumatic and hydraulic cylinder assembly shown generally at 8. Each assembly 8 comprises a pneumatic ram 9 and a double-acting hydraulic piston and cylinder assembly 10 having a common piston rod 11 to which the journal 7 is fixed. The ram 9 forms the lower portion of each assembly 8 and moves the carriage upwards and downwards. The hydraulic piston and cylinder assembly 10 is a conventional double-acting hydraulic piston and cylinder assembly having an inlet at each end of its cylinder so that hydraulic liquid may be applied to both sides of its piston.

The two hydraulic piston and cylinder assemblies 10 are cross-connected, the upper part of the cylinder of one of the assemblies 10 being connected to the lower part of the cylinder of the other assembly 10 and vice versa. The conduits interconnecting the hydraulic piston and cylinder assemblies 10 are shown diagrammatically in FIG. 1. In practice the conduits run along and are connected to the base frame of the machine. Consequently, as the pneumatic rams 9 raise the carriage, hydraulic liquid moves between the upper part of one of the hydraulic assemblies 10 and the lower part of the other to ensure that the two piston rods 11 attached to the opposite ends of the carriage move upwards in unison. Similarly when the pneumatic rams 9 lower the carriage, the movement of hydraulic liquid between the piston and cylinder assemblies 10 ensures that the two piston rods 11 move downwards in unison. This ensures that the attitude of the carriage is maintained constant throughout its cycle of operation.

The rails 3 of the carriage are parallel to and outside the fixed rails 2, and a keg resting on the rails 2 straddles both the rails 2 and the rails 3. The height of the fixed rails 2 is just greater than that of the side rails 3 when the carriage is in its raised position so that the rails 3 move freely beneath a keg which is supported on the rails 2. Each rail 3 includes an upstanding keg locating block 12 at its upstream end. As the carriage moves upwards the keg locating blocks 12 are arranged behind a keg standing on the fixed rails 2 so that as the carriage is moved forwards the blocks engage the outside of the chime of the keg standing on the rails 2 and move it forwards with the carriage. The keg locating blocks 12 include inclined faces which center the keg transversely with respect to the carriage. As an alternative to the blocks 12, a single cup-shaped guide may be used and this engages with the downwardly projecting neck of the keg which is inverted.

As the keg is moved forwards by the blocks 12, or the cup-shaped guide, it moves off the fixed rails 2 and on to the side rails 3 of the carriage. The fixed rails 2 preferably include a chamfered downstream portion so that the keg is transferred smoothly from the rails 2 to the rails 3. This infeed arrangement for accurately locating containers on a walking beam conveyor is the subject of our co-pending British Patent Application No. 39004/75.

The carriage continues to move forward until the keg is located at a first washing station. This first washing station includes a first washing head 13 which is rigidly mounted on the base frame of the machine and as the carriage is lowered the washing head enters the opening in the base of the keg. Clamping pads 14 are moved downwards by a pneumatic cylinder 15 to clamp the keg on to the washing head 13. At this first washing station any ullage remaining in the keg is drained; a first wash with water is given; this water is purged with steam or air, and then a second wash is given to the kegs, this time using detergent; finally the detergent is purged with steam or air into a recovery system. During this wash cycle the carriage is again returned to its initial position.

The pressure is removed from the clamping pads 14 leaving them resting only with their dead weight on the keg to hold it steady on the head 13. The carriage is then once again raised beneath the keg to remove it from the washing head 13 and when the carriage reaches its uppermost position, the pads 14 are raised clear of the keg and the carriage moves forward to take the keg to the second washing station where it is lowered onto the second washing head 16. As the keg is lowered, clamping pads 17 are also lowered to clamp the keg in place. The clamping pads 17 are again operated by a pneumatic cylinder. At this second washing station the keg is again subjected to two washing operations both with water and both are followed by purging with steam. After the second purge, the carriage is raised and the pads 17 are operated in the same way as the pads 14. As the keg is lifted from the head 16, the self-closing valve on the keg closes to keep the keg full of its sterilizing steam under pressure and the keg is moved to an intermediate holding station. The keg is lowered on to a support as the carriage descends and thus remains in the intermediate holding station for one cycle of movement of the conveyor while sterilization continues to take place since the steam is held within the closed keg. The next cycle of movement of the conveyor takes the keg to the racking station.

The racking station includes a racking head 18 and clamping pads 19, which clamp the keg against the racking head 18. At the racking station further steam is introduced into the keg and this is followed by the introduction of carbon dioxide to purge the keg of steam and to pressurize the keg. The keg is then filled with beer, with excess fob being returned through a fob collecting line. At the end of this process the keg is released from the racking station by the clamping pads 19 and is moved by the carriage and placed on a further pair of fixed rails 20. The keg remains here whilst the carriage once again returns to its initial position and as the following keg is being removed from the racking station the downstream end of the carriage pushes the keg along the fixed rails 20 and on to a discharge conveyor 21.

Since the cross-connected hydraulic piston and cylinder assemblies 10 strictly maintain the attitude of the carriage throughout its cycle of operations, once the kegs have been accurately positioned on the carriage by the keg locating blocks 12 or the cup-shaped guide they move into alignment with each process head throughout the machine. All the process heads are rigidly mounted and are consequently much more robust and not easily damaged if, for example, a keg is fed to the machine with its neck and filling opening uppermost. If a cup-shaped guide which is arranged to engage the neck of the keg is provided in place of the blocks 12, a keg with its neck uppermost will not, of course, in any case be fed into the proper position on the conveyor.

Discharge of the kegs on to the discharge conveyor may be controlled in either of two different ways both employing a photo-electric cell which scans the discharge conveyor. In both cases this cell scans the discharge conveyor for a distance upstream from the carriage of the walking beam conveyor and, in the first case, when a gap is seen, discharge from the particular lane is allowed by pushing the keg with the end of the carriage as already described. In the second case, a keg is discharged, again when a gap is seen by the cell, by means of a finger which is raised and engages within the chime of the keg as it stands on the rails 20. The finger discharges the kegs in much the same way as they are fed from the feed conveyor 1 on to the rails 2.

We claim:

1. In a container handling machine including a base frame, a walking beam conveyor for moving the containers step-wise through said machine, said walking beam conveyor including a horizontally extending walking beam assembly, and two spaced-apart upright pneumatic rams for raising and lowering said walking beam assembly, the improvement futher comprising at least two double-acting hydraulic piston and cylinder assemblies, each having a head end and a base end and forming upper and lower hydraulic chambers respectively on opposite sides of the piston slidably mounted within said cylinder, mounting means for mounting said hydraulic piston and cylinder assemblies vertically at spaced-apart locations between said walking beam assembly and said base frame of said machine, and conduit means cross-connecting a head end of one of said cylinder assemblies to a base end of another of said cylinder assemblies to place an upper chamber of one assembly in direct fluid communication with a lower chamber of another of said cylinder assemblies, and vice-versa; whereby, the pistons are constrained to move in unison by the movement of hydraulic fluid between said assemblies to thereby cause the horizontal attitude of said walking beam assembly to be strictly maintained during operation of the upright pneumatic rams in raising and lowering the walking beam assembly.

2. The machine of claim 1, wherein said pneumatic rams are associated with said hydraulic piston and cylinder assemblies and each of said pneumatic rams is arranged to act coaxially with its associated hydraulic piston and cylinder assembly.

3. The machines of claim 2, wherein said operating member of each of said pneumatic rams passes through said hydraulic cylinder associated with said ram and said piston of said associated hydraulic piston and cylinder assembly is mounted on said operating member.

4. The machine of claim 1, which further includes two axles, a pair of wheels mounted on each of said axles, means mounting said axles on said operating members of each of said pneumatic rams, and a carriage supported substantially horizontally by said wheels of both axles whereby it is slidable back and forth.

5. The machine of claim 4, which also includes a further pneumatic ram, said further ram being arranged to move said carriage back and forth.

6. The machine of claim 1, including a support, said support being interdigitated with said walking beam assembly, and being arranged at a height just above the raised position of said walking beam assembly, means for moving containers on to said support, and a locating device connected to and projecting upwards from said walking beam assembly, said locating device being arranged such that after said means has moved a container on to said support, said walking beam assembly is raised and moved beneath said container on said support until said locating device engages said container on said support and moves said container forwards, off the end of said support and on to said walking beam assembly whereby said container is precisely located longitudinally of said assembly.

7. The machine of claim 1 wherein said at least two cylinder assemblies comprise first and second cylinder assemblies, said conduit means connects the head end of the first cylinder assembly to the base end of the second cylinder assembly, and the head end of the second cylinder assembly to the base end of the first cylinder assembly.

* * * * *